United States Patent
Nah et al.

[11] Patent Number: 6,031,886
[45] Date of Patent: Feb. 29, 2000

[54] DIGITAL PHASE ALIGNMENT APPARATUS IN CONSIDERATION OF METASTABILITY

[75] Inventors: Ji Ha Nah; Hee Young Jung; Bhum Cheol Lee; Kwon Chul Park, all of Daejeon, Rep. of Korea

[73] Assignee: Electronics and Telecommunications Research Institute, Dejeon, Rep. of Korea

[21] Appl. No.: 09/137,747

[22] Filed: Aug. 21, 1998

[30] Foreign Application Priority Data

Dec. 3, 1997 [KR] Rep. of Korea ............... 97-65713

[51] Int. Cl.$^7$ .................................................. H03D 3/24
[52] U.S. Cl. ........................ 375/375; 375/371; 370/516
[58] Field of Search ................................. 375/375, 371, 375/373; 370/516, 517, 518; 327/141

[56] References Cited

U.S. PATENT DOCUMENTS 4,814,879  3/1989  McNeely ............................ 358/148
5,533,072  7/1996  Georgiou et al. .................. 375/371

OTHER PUBLICATIONS

A 45–Mbit/s CMOS VLSI Digital Phase Aligner; Robert R. Cordell; 1988.

*Primary Examiner*—Temesghen Ghebretinsae
*Attorney, Agent, or Firm*—Antonelli, Terry, Stout & Kraus, LLP

[57] ABSTRACT

The present invention provides a digital phase alignment which to select the clock whose the transition is occured in the close vicinity of a center of the input data unit interval, the rising transition or falling transition of data are detected, as a result, to generate the synthetic clock retiming data upon detecting the transition of data having a random bit column, the retiming clock is reached in the center of eye pattern of data, compared with a single directional transition is detected.

16 Claims, 9 Drawing Sheets

DIGITAL PHASE ALIGNMENT APPARATUS IN CONSIDERATION OF METASTABILITY

BACKGROUND OF THE INVENTION

1. Field of the Invention

The present invention relates to a digital phase alignment apparatus. More particularly, the present invention relates to a digital phase alignment apparatus in consideration of metastability which detects a rising transition or a falling transition of external input data, generates clock selecting signals using a resolving circuit which uses external input data used as a clock, limits activated clock selecting signal to one, and synthesizes generated clock selecting signals for retiming the external input data stably.

2. Description of the Prior Art

Generally, there exists a jitter occurred by a change of a time and temperature, and a static skew occurred by a delay difference of data bits and a retiming clock in a binary data bit transmitted in a high-speed. Particularly, a high-speed digital data transmitting system is often in the case that an overall system operates by being synchronous to a system clock. In this case, if the phase between a data and a clock doesn't separate enough to satisfy a setup time and hold time of a flip-flop, it is impossible to retime data stably according as a metastability condition happens.

Figure 1:
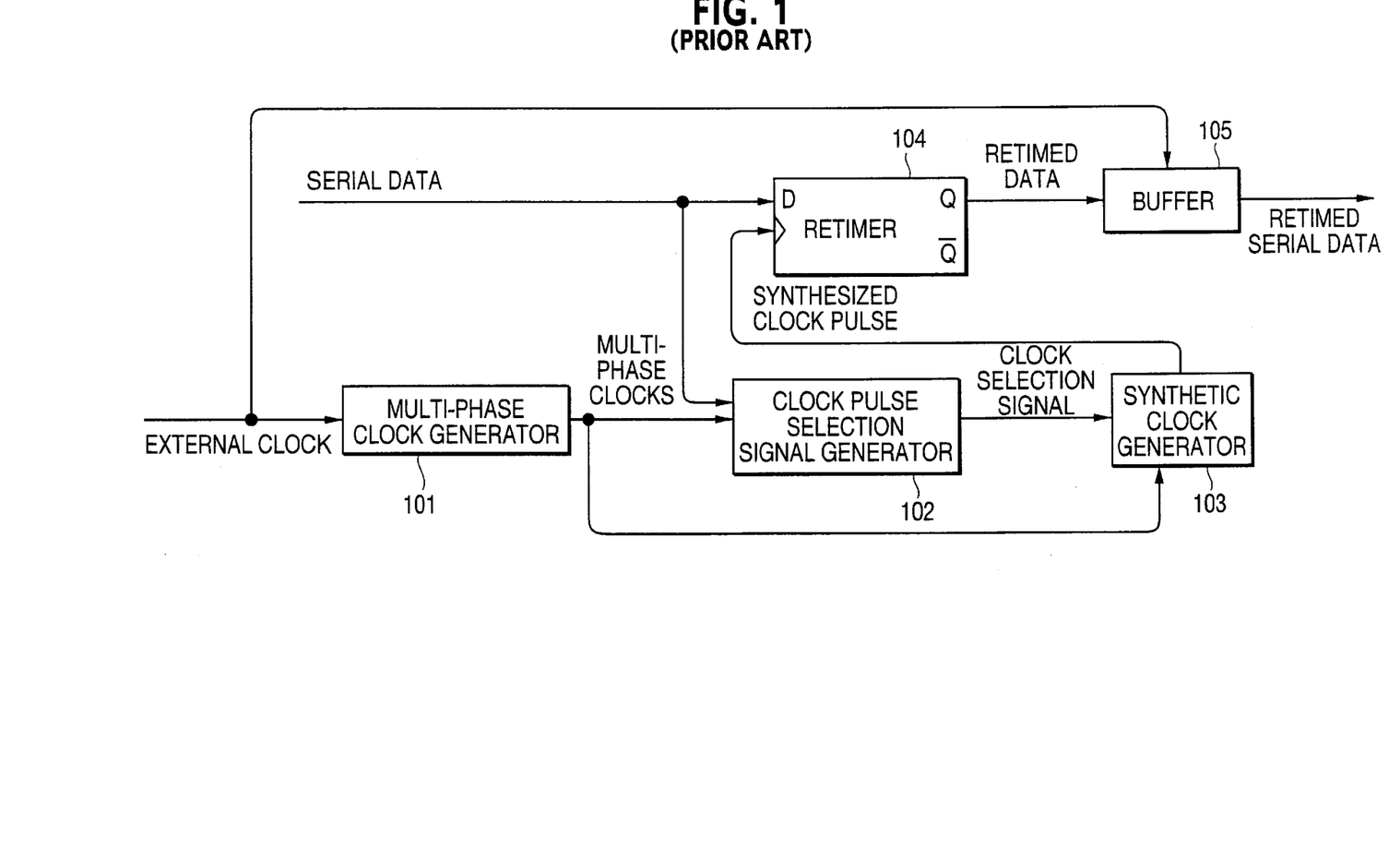
FIG. 1 is a block diagram of a conventional high-speed digital retiming apparatus.

FIG. 1 is a constructional view of a conventional high-speed digital retiming apparatus(application number: 95-50868).

As shown in FIG. 1, the conventional high-speed digital data retiming apparatus comprises a multiple phase clock generator 101, a clock selection signal generator 102, a synthetic clock generator 103, a retiming apparatus 104, and a buffer 105.

There will be explained an operation of a conventional high-speed digital data retiming apparatus constructed as above as follows:

First, the multi-phase clock generator 101 generates the n multi-phase clocks having the n phases. The clock selection signal generator 102 outputs a clock selection signal for selecting more than one clocks among the n number of multi-phase clocks whose a transition occurs in close vicinity to a center of a data unit interval entered from an external.

The synthetic clock generator 103 synthesizes clocks so that a transition of a clock can occur in the center of a data unit interval of an external according to a clock selection signal generated in the clock selection signal generator 102. The retimer 104 retimes the external data according to a clock synthesized in the synthetic clock generator 103. The retimed data of the retimer 104 is buffering according to the external clock through a buffer 105.

In such as a conventional high-speed digital data retiming apparatus, the phase difference between a first and $n^{th}$ clock of the n multi-phase clocks having the n number of phases generated from n/2 delay devices (n is natural number) can become the m period of the clock in compliance with a change of a derating factor according to the operating condition.

If the phase difference between a first and $n^{th}$ clock among the n multi-phase clocks is the m period, the selection signal number generated from the clock selection signal generator 103 is m, as a result, there can be used m clocks for producing a synthetic clock from the synthetic clock generator 103.

In the case of producing the synthetic clock from several clocks, the duty cycle of the synthesized clock is below 50%, there can not be the minimum pulse width as a clock and be small the range of permissible input jitter because the duty is gradually high or low according to the number of clock taking part in the synthesis.

Furthermore, since there is a jitter between an external data and the clock inputted from the multi-phase clock generator 101 in the clock selection signal generator 102, the flip flop of the synchronizing circuit and resolving circuit is operated in the state not synchronizing, so that the state of the output value is neither logic "0" nor "1" in the case that a setup time or a hold time between data and clocks are not insured.

At this time, in the case that a metastability occurs in the flip flop of the synchronizing circuit and resolving circuit, it is problematic that a conventional high-speed digital data retiming apparatus fails to generate the clock selection signal.

SUMMARY OF THE INVENTION

It is an object of the present invention to provide a digital phase alignment apparatus which detects a rising transition or a falling transition of external input data, generates clock selecting signals using a resolving circuit which uses external input data used as a clock, limits activated clock selecting signal to one, and synthesizes generated clock selecting signals for retiming the external input data stably.

In order to accomplish the above object, the present invention provides a digital phase alignment apparatus in consideration of metastability, comprising: a multi-phase clock generator for delaying source clock to generate first to $n^{th}$ multi-phase clocks, first multi-phase comparator and clock phase selector for detecting a clock whose transition is occurred in close vicinity of a center of external input data, among first to $k+1^{th}$ multi-phase clocks, to generate the k number of clock selecting signals, and generating a masking output signal when activated clock selecting signal is occured among the k number of clock selection signals, second multi-phase comparator and clock phase selector for detecting a clock whose transition is occured in close vicinity of a center of external input data, among $k+1^{th}$ to $2k+1^{th}$ multi-phase clocks, to generate the k number of clock selection signals, generating a masking output signal when activated clock selecting signal is occured among the k number of clock selecting signals, and masking activated clock selecting signal when the masking output signal of the first multi-phase comparating and clock phase selecting means is inputted, $m^{th}$ multi-phase comparator and clock phase selector for detecting a clock whose transition is occured in close vicinity of a center of external data, among $n-k^{th}$ to $n^{th}$ multi-phase clocks, to generate k number of clock selecting signals, generating a masking signal when activated clock is occured among the k number of clock selection signals, and masking activated clock selecting signal when a masking input signal is inputted, a OR gate for ORing masking output signals of the $m^{th}$ multi-phase comparator and clock phase selector means to generating a masking input signal, and supplying the masking input signal to the $m^{th}$ multi-phase comparator and clock phase selector, a synthetic clock generator for synthesizing the n−1 number of clock selection signals, and a retiming buffer for retiming external input data according to the synthesized clock of the synthetic clock generator.

In order to accomplish the above object, the present invention provides a digital phase alignment apparatus in consideration of metastability, comprising: a multi-phase clock generator for delaying source clock to generate first to 2+1$^{th}$ multi-phase clocks, first multi-phase comparator and clock phase selector for detecting a clock whose transition is occurred in close vicinity of a center between the external input data and the external inverting input data, among first to k+1$^{th}$ multi-phase clocks, to generate the k number of clock selecting signals, and generating a masking output signal when activated clock selecting signal is occured among the k number of clock selection signals, second multi-phase comparator and clock phase selector for detecting a clock whose transition is occured in close vicinity of a center between the external input data and the external inverting input data, among k+1$^{th}$ to 2k+1$^{th}$ multi-phase clocks, to generate the k number of clock selection signals, generating a masking output signal when activated clock selecting signal is occured among the k number of clock selection signals, and masking activated clock selecting signal when the masking output signal of the first multi-phase comparator and clock phase selector is inputted, a synthetic clock generator for synthesizing the 2k number of clock selecting signals to generate a composite clock, and a retiming buffer for retiming external input data according to the composite clock of the synthetic clock generator.

BRIEF DESCRIPTION OF THE DRAWINGS

The above and other objects and features of the present invention will become apparent from the following description of preferred embodiments, when taken in conjunction with the accompanying drawings, in which.

DETAILED DESCRIPTION OF THE PREFERRED EMBODIMENTS

Hereinafter, the embodiment of the present invention will be explained with reference to the attached drawings.

Figure 2:
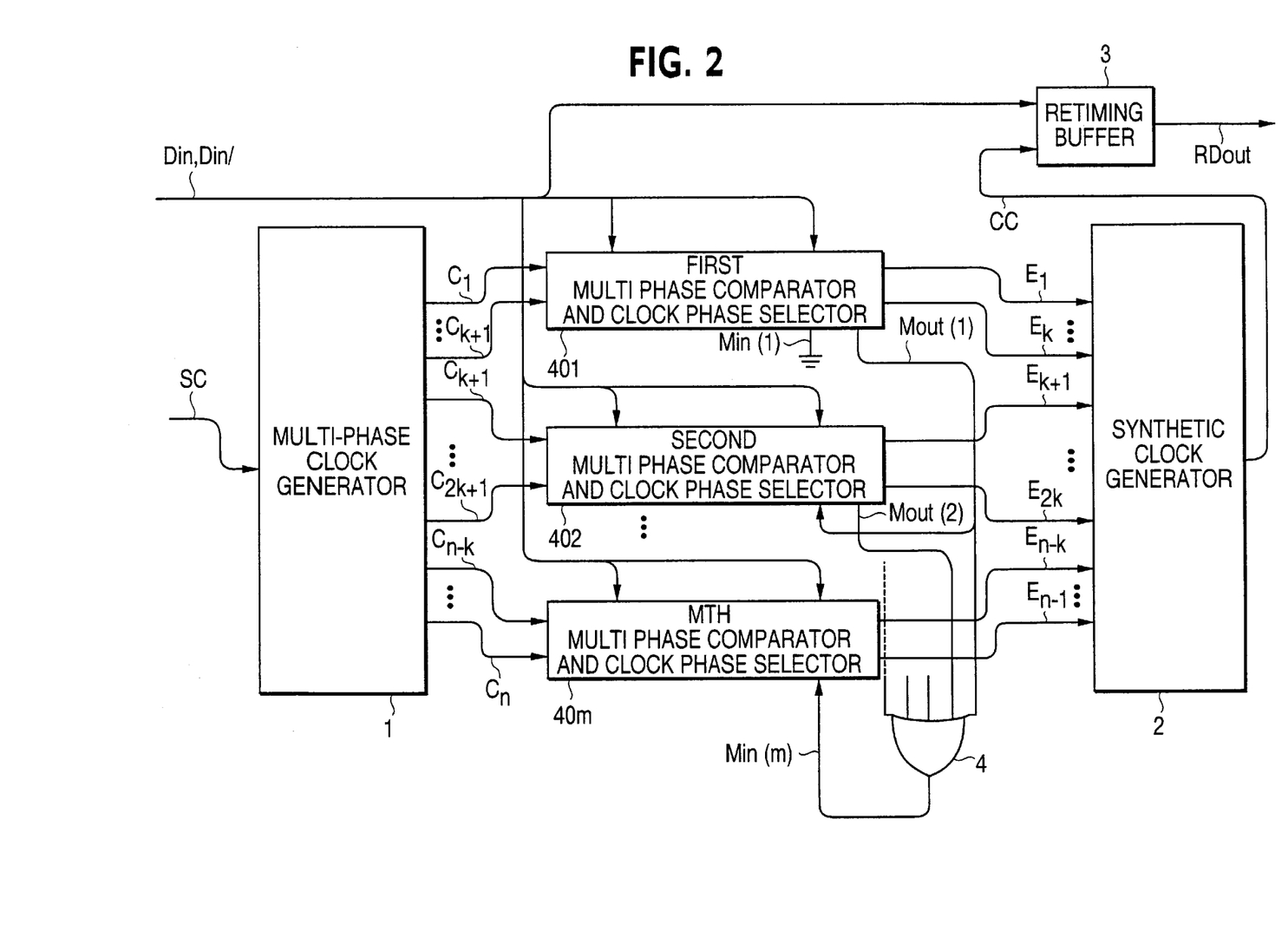
FIG. 2 is a block diagram of a digital phase alignment apparatus in consideration of a metastability according to the present invention.

FIG. 2 is a block diagram of a digital phase alignment apparatus in consideration of metastability according to first embodiment of the present invention.

As shown in FIG. 2, the digital phase alignment apparatus comprises a multi-phase clock generator 1 for delaying source clock SC to generate first to n$^{th}$ multi-phase clocks ($C_1$~$C_n$), a first multi-phase comparator and clock phase selector 401 for detecting a clock whose transition is occurred in close vicinity of a center of external input data (Din, Din/), among first to k+1$^{th}$ multi-phase clocks ($C_1$~$C_{k+1}$), to generate the k number of clock selecting signals ($E_1$~$E_k$), and generating a masking output signal (Mout(1)) when activated clock selecting signal is occured among the k number of clock selecting signals ($E_1$~$E_k$), a second multi-phase comparator and clock phase selector 402 for detecting a clock whose transition is occured in close vicinity of a center of external input data (Din, Din/), among k+1$^{th}$ to 2k+1$^{th}$ multi-phase clocks ($C_{k+1}$~$C_{2k+1}$, to generate the k number of clock selection signals ($E_{k+1}$~$E_{2k}$), generating a masking output signal (Mout(2)) when activated clock selecting signal is occured among the k number of clock selecting signals ($E_{k+1}$~$E_{2k}$), and masking activated clock selecting signal when the masking output signal (Mout(1)) of the first multi-phase comparator and clock phase selector is inputted, a m$^{th}$ multi-phase comparator and clock phase selector for detecting a clock whose transition is occured in close vicinity of a center of external input data (Din, Din/), among n-k$^{th}$ to n$^{th}$ multi-phase clocks ($C_{n-k}$~$C_n$), to generate k number of clock selecting signals ($E_{n-k}$~$E_{n-1}$), generating a masking output signal (Mout(m)) when activated clock is occured among the k number of clock selection signals, and masking activated clock selecting signal ($E_{n-k}$~$E_{n-1}$) when the masking input signal (Min (m)) is inputted, a OR gate 4 for ORing masking output signals (Mout(1)~Mout(m)) of the first to m$_{th}$ multi-phase comparator and clock phase selector (401~40 m) to generate a masking input signal (Min(m)), and supplying the masking input signal (Min(m)) to the m$_{th}$ multi-phase comparator and clock phase selector 40 m, a synthetic clock generator 2 for synthesizing the n-1 number of clock selection signals ($E_1$~$E_{n-1}$) to generate a composite clock CC, and a retiming buffer 3 for retiming the external input data (Din, Din/) according to the composite clock CC of the synthetic clock generator 2.

The operation of the the digital phase alignment apparatus will now be explained with reference to FIG. 2 and FIG. 6A to FIG. 6F.

Figure 6A:
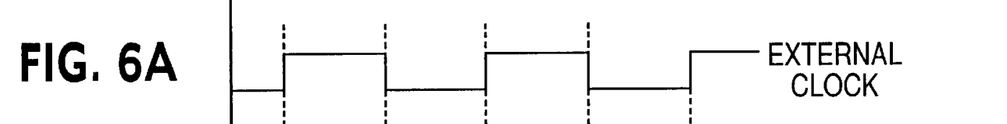
FIGS. 6A–6F are a main timing view of a multi-phase generating means in FIG. 2.
Figure 6B:
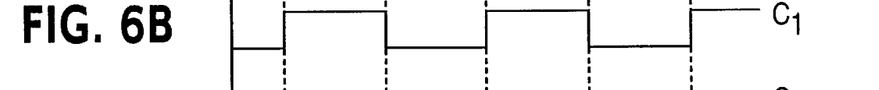
Figure 6C:
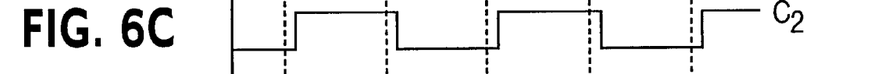

The multi-phase clock generator 1 delays source clock SC as shown in FIG. 6A using the n-1 number of delay devices (not shown) (n is natural number) to generates the n number of multi-phase clocks ($C_1$~$C_n$) having the n number of phases, as shown in FIGS. 6B to 6F and FIGS. 7A to 7H.

Here, the phase difference between the first clock $C_1$ and the n$_{th}$ clock $C_n$ is greater than or equal to the period T of the source clock SC.

The first multi-phase comparator and clock phase selector 401 detects a clock whose transition is occured in close vicinity of a center between an external input data and an external inverting input data (Din, Din/) among a first to k+1$^{th}$ multi-phase clocks of the multi-phase clock generator 1, to generate a rising transition detecting signal and falling transtion detecting signal.

The first multi-phase comparator and clock phase selector 401 generates the k number of clock selecting signals ($E_1$~$E_k$) using the rising transtion detecting signal the falling transtion detecting signal.

Here, the transition of the detected clock is a rising transition in the case of retiming to a rising transition of the clock, or a falling transition in the case of retiming to the falling transition of the clock.

The first multi-phase comparator and clock phase selector 401 outputs a masking output signal (Mout(1)) when an activated clock selecting signal is occurred among the k number of clock selecting signals ($E_1$~$E_k$).

A masking input signal (Min(1)) of the first multi-phase comparator and clock phase selector 401 is set to zero.

The second multi-phase comparator and clock phase selector 402 detects a clock whose transition is occured in close vicinity of a center between the external input data Din and the external inverting input data Din/ among k+1$^{th}$ to 2k+1$^{th}$ multi-phase clocks of the multi-phase clock generator 1, to generate a rising transtion detecting signal and falling transtion detecting signal.

The second multi-phase comparator and clock phase selector 402 generates the k number of clock selecting signals ($E_{k+1}$~$E_{2k}$) using the rising transition detecting signal and the falling transtion detecting signal.

Here, the transition of the detected clock is a rising transition in the case of retiming to a rising transition of the clock, or a falling transition in the case of retiming to the falling transition of the clock.

The second multi-phase comparator and clock phase selector 401 outputs a masking output signal (Mout(2)) when an activated clock selecting signal is occurred among the k number of clock selecting signals ($E_{k+1}$~$E_{2k}$).

The second multi-phase comparator and clock phase selector 401 masks the activated clock selecting signal when the masking output signal (mout(1)) of the first multi-phase comparator and clock phase selector 401 is inputted.

The m$^{th}$ multi-phase comparator and clock phase selector 40m detects a clock whose transition is occured in close vicinity of a center between the external input data Din and the external inverting input data Din/ among n-1$^{th}$ to n$^{th}$ multi-phase clocks of the multi-phase clock generator 1, to generate a rising transtion detecting signal and falling transtion detecting signal.

The m$^{th}$ multi-phase comparator and clock phase selector 40m generates the k number of clock selecting signals ($E_{n-k}$~$E_{n-1}$) using the rising transition detecting signal and the falling transtion detecting signal.

Here, the transition of the detected clock is a rising transition in the case of retiming to a rising transition of the clock, or a falling transition in the case of retiming to the falling transition of the clock.

The m$^{th}$ multi-phase comparator and clock phase selector 40m outputs a masking output signal (Mout(m)) when an activated clock selecting signal is occurred among the k number of clock selecting signals ($E_{n-k}$~$E_{n-1}$).

The m$^{th}$ multi-phase comparator and clock phase selector 40m masks the activated clock selecting signal when the masking output signal (Mout(m-1)) of the m-1$^{th}$ multi-phase comparator and clock phase selector (40(m-1)) is inputted.

A OR gate 4 ORs clock selecting signals of first to mth multi-phase comparator and clock phase selector (401~40m) to limit the activated selecting signal to 1 among the n-1 number of the clock selecting signals. And a ORing signal (masking input signal Min(m)) of the OR gate 4 is supplied to the mth multi-phase comparator and clock phase selector 40m.

Figure 7A:
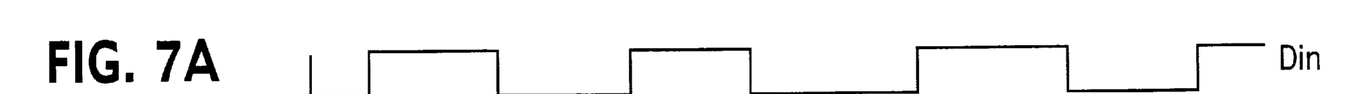
FIGS. 7A–7H are a main timing view of a positive phase comparator and phase selector when occurring a metastability in FIG. 4.
Figure 7B:
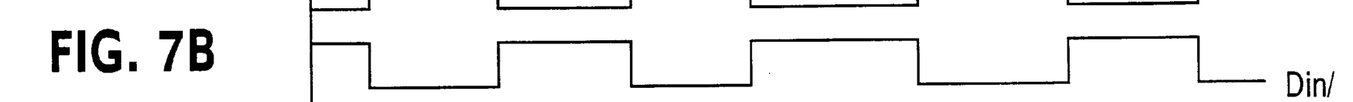
Figure 7C:
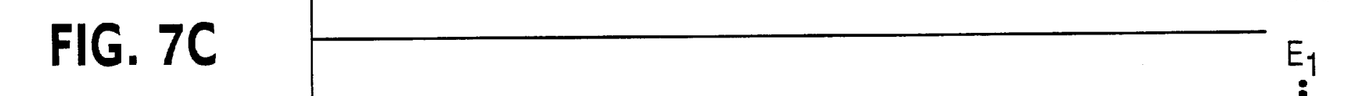
Figure 7D:
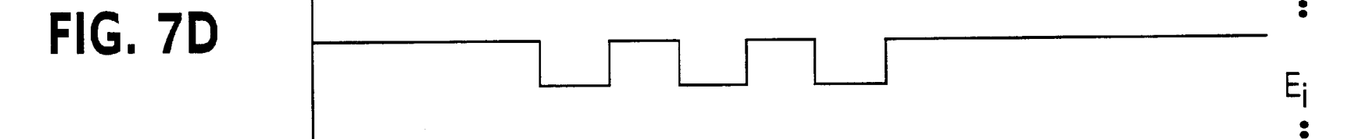
Figure 7E:
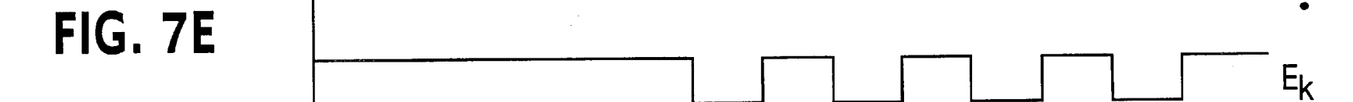
Figure 7F:
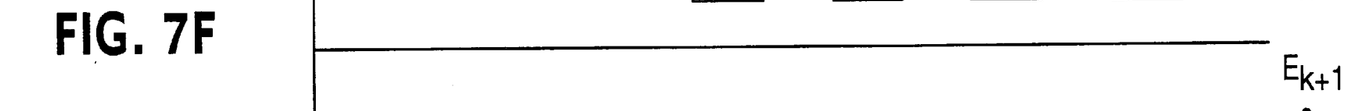
Figure 7G:
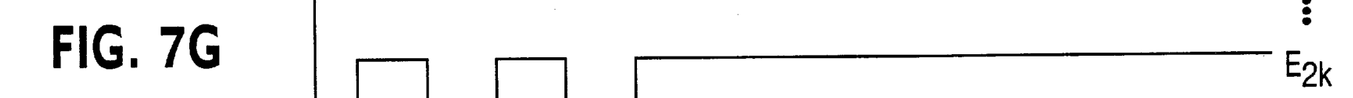
Figure 7H:
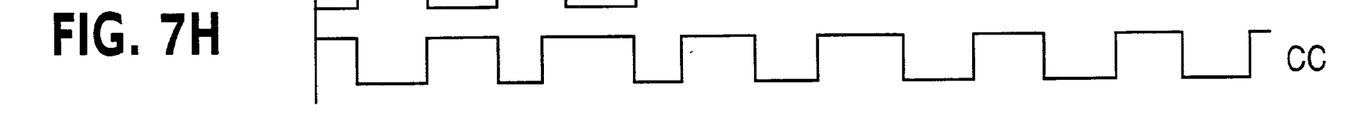

The synthetic clock generator 2 synthesizes the n-1 number of clock selecting signals ($E_1$~$E_{n-1}$) to generate a composite clock CC as shown in FIG. 7H.

The retiming buffer 3 retimes the external input data Din and the external inverting input data Din/ according to the composite clock of the synthetic clock CC so that a slip can not occur upon absorbing it when the phase of data (Din, Din/) slowly wanders above one period of the source clock SC by virtue of positive value or negative value.

FIGS. 6A to 6F illustrate a main timing view of the multi-phase clock of the multi-phase clock generator.

As shown in FIGS. 6B to 6F, the clocks ($C_1$, $C_2$, . . . , $C_r$ . . . , $C_k$, . . . $C_n$)illustrate the n number of multi-phase clocks respectively.

Figure 6D:
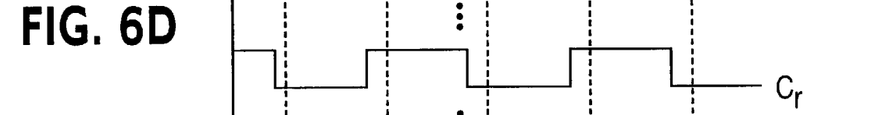
Figure 6E:
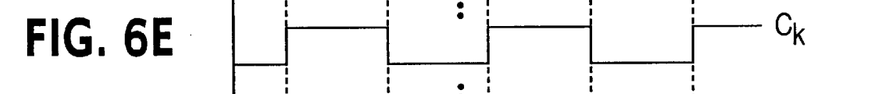
Figure 6F:
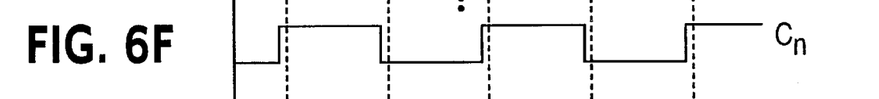

The temporary clock Cr as shown in FIG. 6D becomes a clock delayed by using a delay devices to the clock Cr-1 of the previous delay device.

Since the phase difference of $C_1$ to $C_n$ is greater than one period 1T of the source clock SC as shown in FIG. 6A, the first to $n_{th}$ multi-phase clock (C1~$C_n$) can detect all the transition of external input data occurring between one period of the source clock SC.

Furthermore, the derating factor changes by means of the change of the operating condition, the phase difference of first and n$^{th}$ multi-phase clock can be the period of clock m (m>1 natural number). This can be illustrated such as Ck and Cn of FIGS. 6E and 6F.

FIGS. 7A to 7H are to generate the optimum synthetic clock for stably retiming data taking NAND gate for all clock selecting signals(E1, . . . , En-1) generated by the multi-phase comparator and clock phase selectors(401, . . . , 40m).

The synthetic clock CC limits the clock selecting signal taking part in the synthesis to 1, so the minimum pulse width of clock is insured, the range of the input permissible jitter becomes high.

Figure 3:
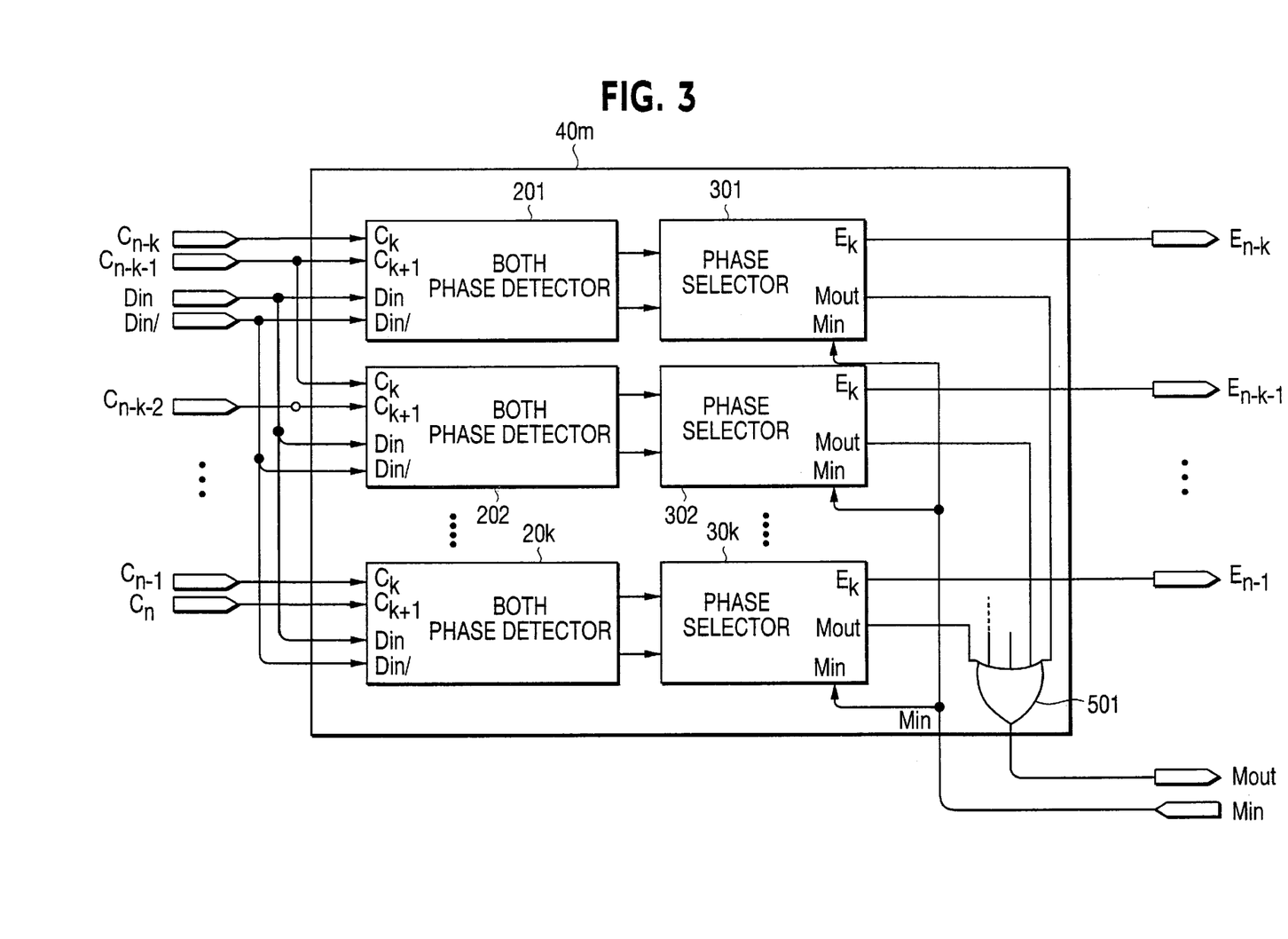
FIG. 3 is a detail block diagram of a multi-phase comparator and clock phase selector in FIG. 2 according to the embodiment of the present invention.

FIG. 3 shows one embodiment of a multi-phase comparator and clock phase selectors.

As shown in FIG. 3, the $m_{th}$ multi-phase comparator and clock phase selector (40m) includes a k number of both phase detector (201~20k) for detecting clock whose transition is occured in close vicinity of a center of rising transition or falling transition of external input data (Din, Din/) respectively, among two number of adjacent multi-phase clocks (($C_{n-k}$,$C_{n-k-1}$), ($C_{n-k-2}$,$C_{n-k-3}$)~($C_{n-1}$,$C_n$)) of the multi-phase clock generator 1, to generate a rising transition detecting signal and falling transition detecting signal, a k number of phase selector (301~30k) for generating the k number of clock selecting signals ($E_1$~$E_k$) and masking signals using the rising transition detecting signal and falling transition detecting signal generated by the k number of corresponding both phase detector (201~20k), a OR gate 501 for ORing the k number of masking signals generated by the k number of phase selector (301~30k).

The operation of mth multi-phase comparator and clock phase selector will now be explained.

The respective both phase detectors(201, 202, . . . , 20k) detect clock pulse whose transition is occured in close vicinity of a center of ristion transition or falling transition of the external data (Din, Din/) to generate rising and falling transition detecting signals from two adjoining multi-phase clocks (($C_{n-k}$, $C_{n-k-1}$) . . . ($C_{n-1}$, $C_n$)).

The phase selectors(301,302, . . . ,30k) generates the k number of the clock selecting signal ($E_{n-k}$~$E_{n-1}$) through the resolving circuit using the external data (Din, Din/) used as the clock to reduce metastability which can occur from the rise and fall transition detecting signals of the external data (Din, Din/).

At this time, if there is an activated state to any one of k number of the clock selecting signals (En-k~En-1), masking output signals Mout of the k number of phase selectors (301~30k) are ORed through OR gate 501 for masking the clock selecting signals of the other multi-phase comparator and clock phase selector.

On the contrary, if the masking input signals are inputted, the clock selecting signals are masked.

As a result, if there are generated the clock selecting signals activated by a temporary $r^{th}$ multi-phase comparator and phase selectors among the m number of the multi-phase comparator and phase selector, there are not the clock selecting signals activated by the first to the $r-1^{th}$ multi-phase comparator and the clock phase selector (301~30r). The number of the activated clock selecting signal among the n−1 number of the clock selecting signals (E1~En−1) is always 1, because the $r+1^{th}$ to $m^{th}$ clock selecting signals are masked.

Figure 4:
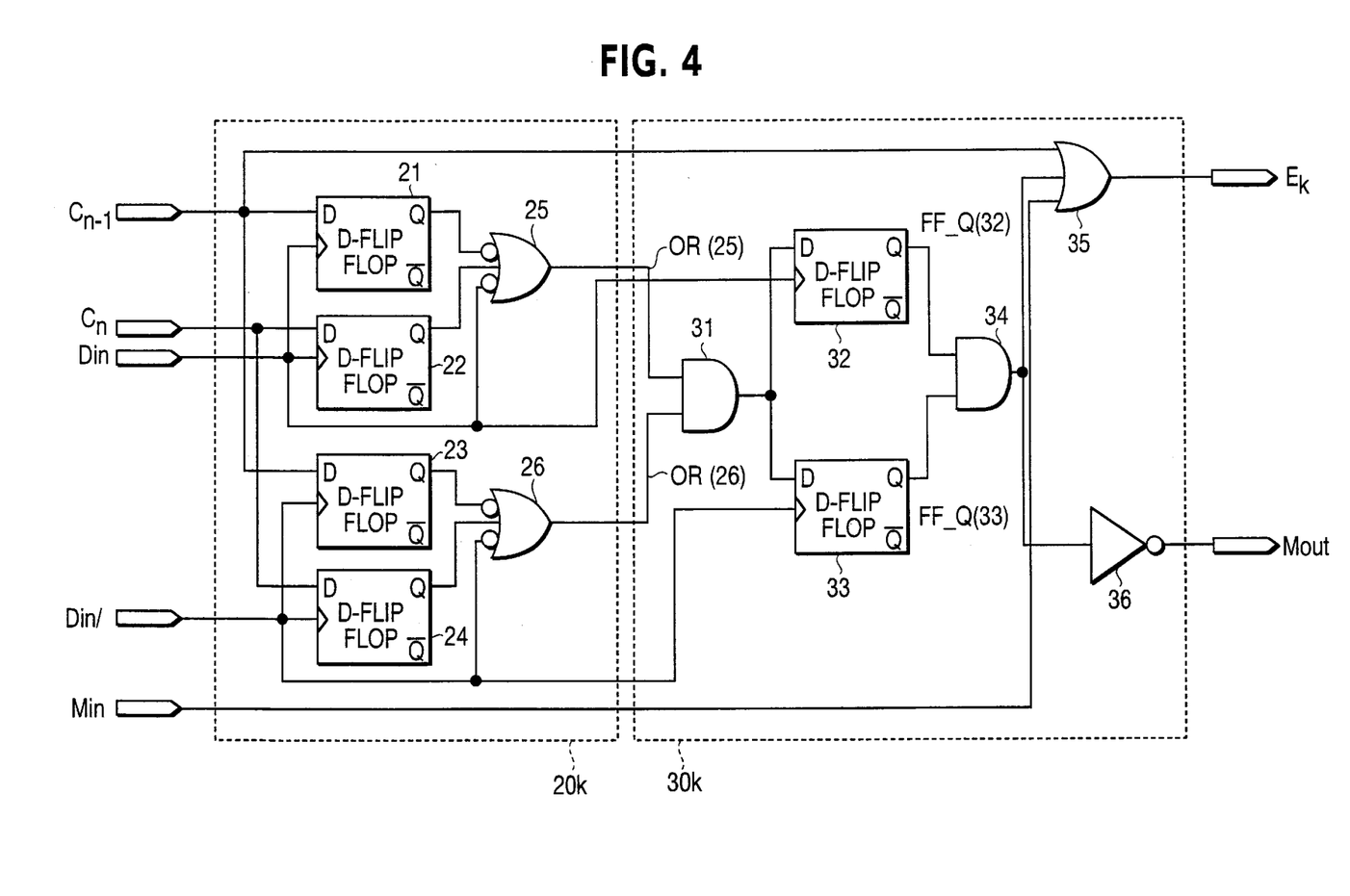
FIG. 4 is a detail block diagram of a positive phase detector and phase selector in FIG. 3.

FIG. 4 shows a detailed circuit of one embodiment of the both phase detector and phase selector.

As shown in FIG. 4, the both phase detector 20k includes first and second D flip-flops (21, 22) for delaying two number of adjacent clocks ($C_{n-1}$, $C_n$) according to external input data (Din, Din/) used as a clock, a first OR gate 25 for ORing inverting signal of output signal of first D flip-flop 21, output signal of second D flip-flop 22, and inverting signal of external input data $D_{in}$ to generate rising transition detecting signal OR(25);

third and fourth D flip-flops (23,24) for delaying two number of adjacent clocks ($C_{n-1}$,$C_n$) according to external inverting input data Din/ used as a clock, second OR gate 26 for ORing inverting signal of output signal of third D flip-flop 23, output signal of fourth D flip-flop 24, and inverting signal of the external inverting input data to generate falling transition detecting signal OR(26).

As shown in FIG. 4, the phase selector 30k includes first AND gate 31 for ANDing the rising tansition detecting signal OR(25) and the falling transition detecting signal OR(26) generated by first and seconcd OR gates (25,26) of the both phase detector 20k, first D flip-flop 32 for delaying the output singnal of the first AND gate 31 according to external input data Din used as a clock to generate a delay signal FF_Q(32), second D flip-flop 33 for delaying the output signal of first AND gate 31 according to external inverting input data Din/ used as a clock to generate a delay signal FF_Q (33), a second AND gate 34 for ANDing the delay signals (FF_Q(32), FF_Q(33)) of first and second D flip-flops (32,33), a OR gate 35 for ORing the one clock among two number of adjacent clocks generated by the multi-phase clock generator 1, the output signal of the second AND gate 34, and masking input signal Min of the OR gate 4 to generate clock selecting signal $E_k$, an inverter 36 for inverting the output signal of second AND gate 34 to generate a masking output signal Mout.

The operation of the the both phase detector and phase selector will now be explained with reference to FIGS. 8A to 8K and FIGS. 9A to 9K.

Figures 8A, 8B:
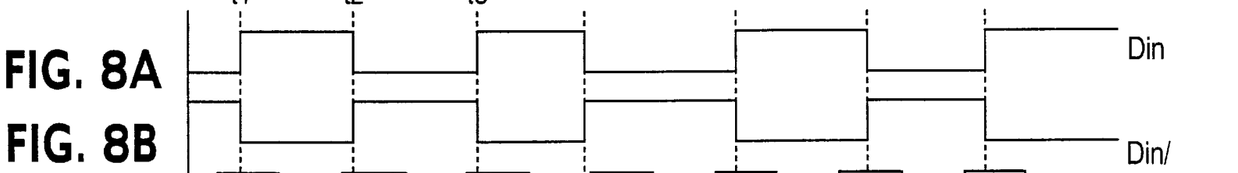
FIGS. 8A–8K are a main timing view of a positive phase comparator and phase selector when occurring a metastability in FIG. 4.
Figures 8C, 8D:
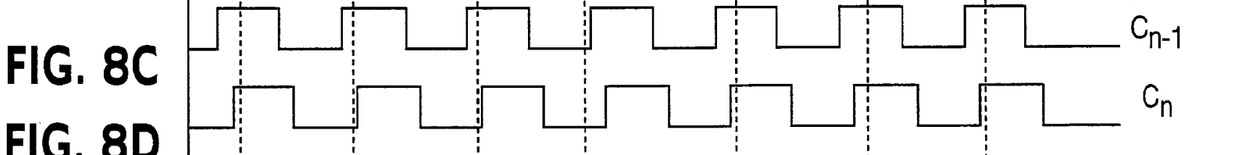
Figures 8E, 8F:
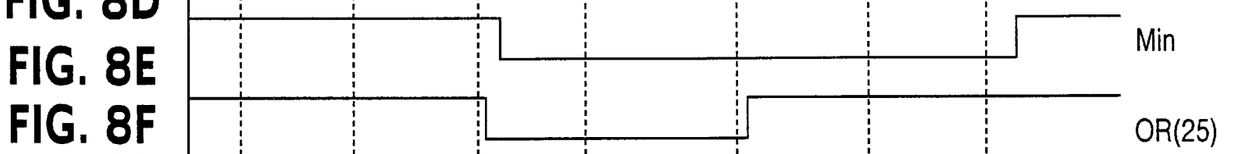
Figure 8G:
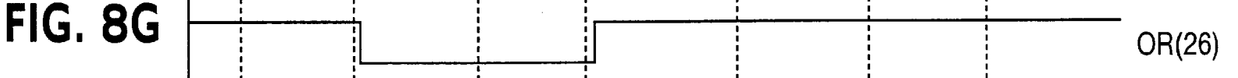
Figures 8H, 8I, 8J:
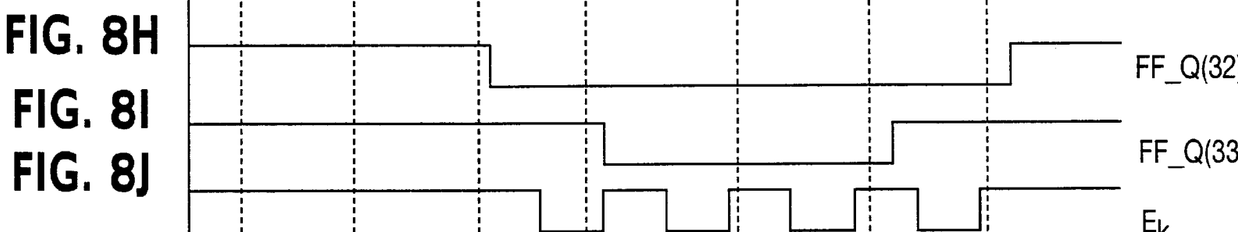
Figure 8K:
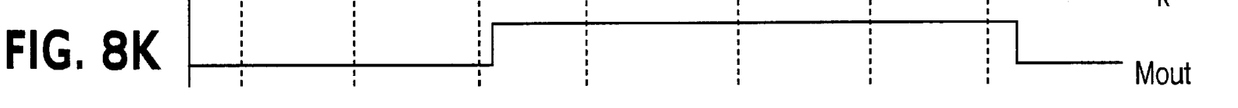

D flip-flops (21~24) of the both phase detector 20k retime adjoining multi-phase clocks (Cn−1,Cn) according to the external input data Din and external inverting data Din/ used as a clock to generating the rising and falling transition detecting signals (OR(25), OR(26)) as shown in FIGS. 8F and 8G of the external data (Din, Din/) as shown in FIGS. 8A and 8B.

When the retiming output values of D flip-flops(21, 22) or D flip-flops(23, 24) are in the combination of(Qk, Qk+1)=(1, 0), the rising and falling transition detecting signal (OR(25), OR(26)) becomes the activated state.

A AND gate 31 of the phase selector 30k is made as one signal by ANDing the rising transition detecting signal OR(25) and the falling transition detecting signal OR(26).

A resolving flip-flop, namely, D flip-flops (32,33) retime the output signal of the AND gate 31 using the same clock as the clock of D-flip flops (21,22),(23,24) to prevent the metastability.

A AND gate 34 takes ANDing the retiming output signal of the D flip-flops (32,33), and a OR gate 35 ORs a multi-phase clock Cn−1, the masking input signal Min, and the output signal of the AND gate 34 to generate the clock selecting signal Ek.

A inverter 36 inverts the output signal of the AND gate 34 to generate the masking output signal Mout.

Figure 9A:
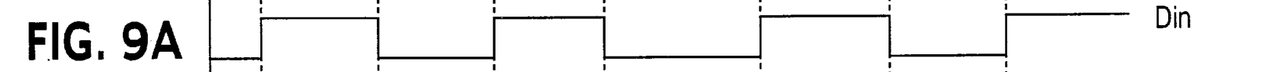
FIGS. 9A–9K are a main timing view of a multi-phase comparator and clock phase selector in FIG. 5.
Figure 9B:
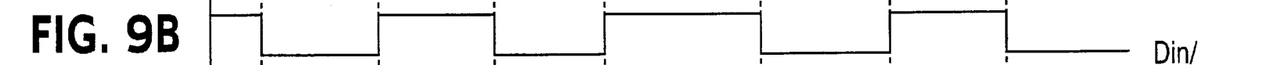
Figure 9C:
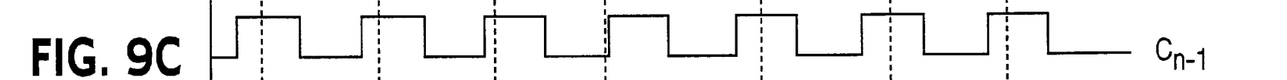
Figures 9D, 9E:
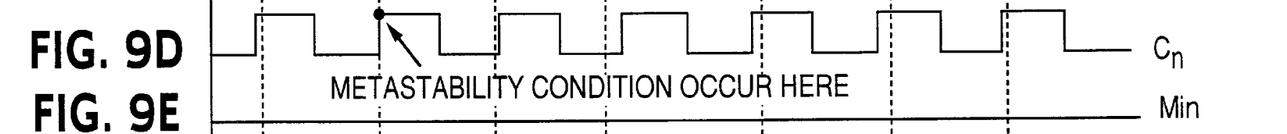
Figures 9F, 9G:
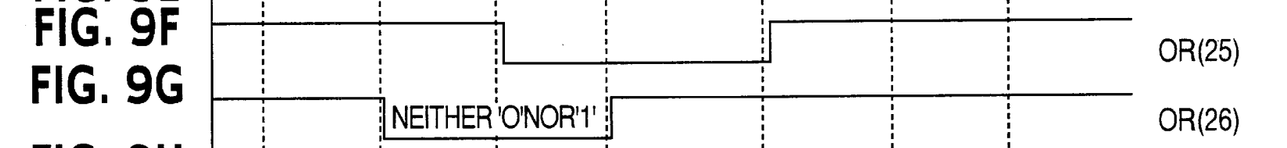
Figures 9H, 9I, 9J:
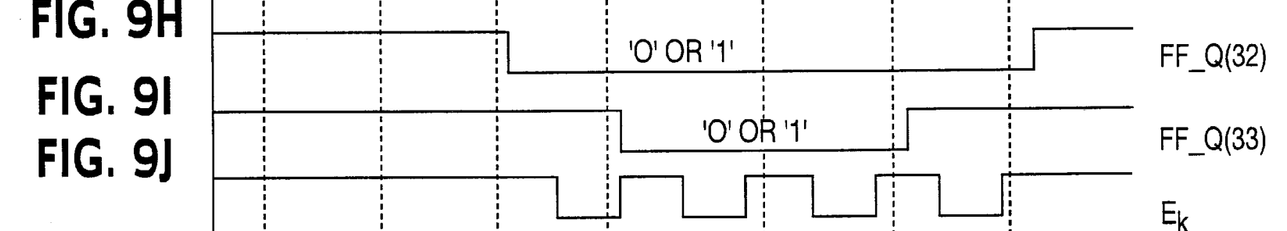
Figure 9K:
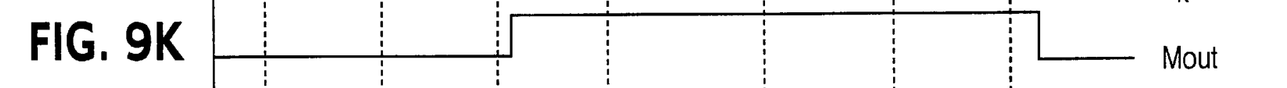

However, since the multi-phase clocks (Cn−1 or Cn) used as a data and the external data (Din, Din/) of the D flip flops (21,22) are not synchronized, there happens such state as the output value is neither logic '0' nor '1' according to the metastability condition, as a result, it to be transmitted to the next terminal, as shown in FIG. 9G.

If all D flip-flops (21, 22) are under the metastable state or all D flip-flops (23, 24) are under the metastable state, simultaneously D flip-flops (32, 33) are under the metastable state, the synthetic clock is failed.

However, since the clock of D flip-flop 32 is synchronized with the clock of D flip-flops (21,22) and the clock of D-flip flop 33 is synchronized with the clock of D flip flops (23, 24), the output value of D flip-flops (32, 33) logically has a stabled value.

For the reason for detecting both the rising and falling transition of the external data (Din, Din/), if the clock selecting signal is outputted taking the clock of D flip flop 32 of the resolving flip flop as data after detecting the rising transition of data as the bit column of data is random, the clock selecting signal is outputted in approaching to the next rise transition. When the phase of data inputted from the external slowly wanders to more than one period of the exterior clock in the case of a long period, there can not be insured the optimum clock to retime data stably.

To compensate it, there was additioned a circuit detecting about whether the transition of the clock occurs in adjoining to the fall transition. Finally, the outputted Ek is. that the selected multi-phase clock is outputted in the interval whose the clock selection signal is activated, a logic '1' is outputted in the inactivated interval.

The masking signal Mout is outputted as a logic '1' so that the clock selection signal can be masked from other multi-phase comparator and clock phase selector in the interval whose the clock selection signal is activated, on the contrary, if the masking signal is inputted from the external, to be outputted upon masking the clock selection signal.

FIG. 7 is a main timing view of a both phase detector and phase selectork.

The transition of input data (Din, Din/) at a temporary time t1 doesn't exist in the transition portion of Ck and Ck+1. However, in the case that the phase of the input data wanders by jitter or wonder, the rising transition of the external inverting data Din/ such as t2 exists between the rise transitions of Ck and Ck+1.

At this time, since the value of retiming $C_k$ to the rising transition of the data Din/ is different from that of retiming $C_{k+1}$ each other, it can detect that the transition of data occur in the interval. Similarly, in the t3, it is possible to know that the rising transition of the input data occurs. After the multi-phase clocks $C_k$ and $C_{k+1}$ generated from the multi-phase generator are retimed by means of the rise transition of data Din and invering data Din/, if the transition in the rising transition of data is detected, the output of OR gate 25 of the rising transition detecting signal is activated, if the transition in the rise transition of the inverse data is detected, the output of OR gate 26 of the fall transition detecting signal is activated.

The output of OR gates 25, 26 is outputted to FF_Q32 and FF_Q 33 respectively inputted to D-flip flop 32, 33 respectively after taking a logic-multiplying, therefore, the clock selection signal $E_k$ is outputted upon logic-adding the signal synthesizing FF_Q32 and FF_Q 33 to $C_k$.

Furthermore, in the case that the clock selection signal is activated, to be outputted to the masking signal Mout taking the result of the logic-multiply of FF_Q32 and F_Q 33 as an inverter so that the clock selection signal of the clock phase selector and other multi-phase comparator can be masked, to mask all the clock selection signal of the other multi-phase comparator and clock phase selector. On the contrary, if the masking signal is inputted from the other multi-phase comparator and clock phase selector, the clock selection signal is outputted by means of masking.

FIG. 8 is a main timing view of the positive phase detector 20k and phase selector 30k when the metastability condition occurs, in which the transition of the input data at a temporary time t1 doesn't exist in the transition portion of $C_k$ and $C_{k+1}$.

However, if $C_k$ and $C_{k+1}$ are retimed to the rise transition of the inverse input data in the case that the phase of the inputted data at t2 wanders by means of jitter or wander, $C_k$ is stably retimed, however, the value such as the output of OR gate 26 is neither '0' nor '1' according as the metastability condition occurs when $C_{k+1}$ are retimed.

However, the output value through D-flip flops 32, 33 of the phase selector is '0' or '1'. At this time, to be inputted in Min='0', if all the output of FF_Q32 and FF_Q 33 of output of D-flip flops 32, 33 are '0', $E_k$ is outputted to the activated state in the interval whose the transition is detected, if all the output of FF_Q32 and FF_Q 33 are '1', $E_k$ becomes '1' to the inactivated state.

If $E_k$ becomes '1', the other clock selection signal becomes in the active state, becomes to output upon selecting the multi-phase clock. In the case of Min='1', the clock selection signal is outputted by means of masking.

Figure 5:
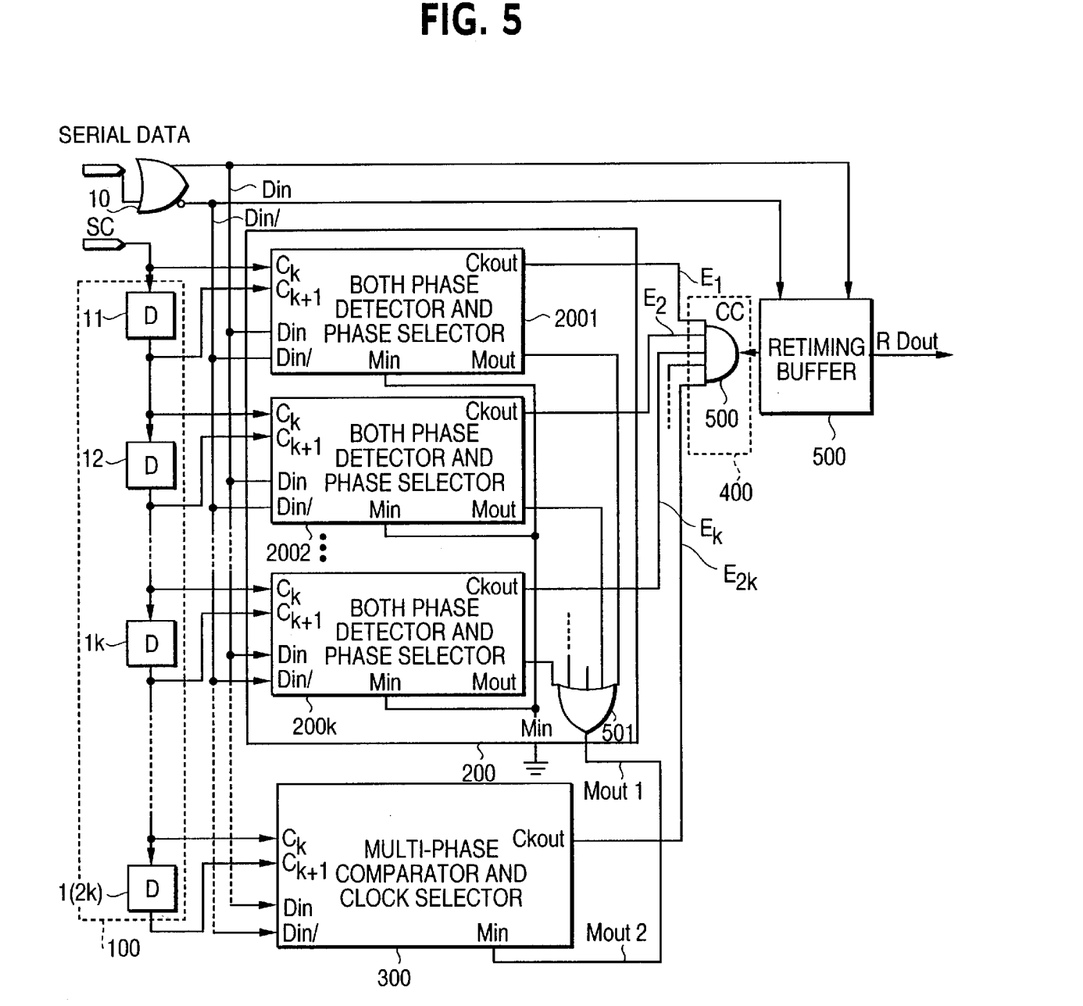
FIG. 5 is a detail block diagram of a digital phase alignment apparatus whose a multi-phase comparator and clock phase selector is two in FIG. 2.

FIG. 5 is a block diagram of the digital phase alignment apparatus in consideration with metastability according to second embodiment of the present invention.

As shown in FIG. 5, the digital phase alignment apparatus includes a multi-phase clock generator 100 for delaying a source clock SC to generate first to $2k+1^{th}$ multi-phase clocks, a first multi-phase comparator and clock phase selector 200 for detecting a clock whose transition is occurred in close vicinity of a center between an external input data Din and an external inverting input data Din/, among first to $k+1^{th}$ multi-phase clocks generated by the multi-phase clock generator 100, to generate the k number of clock selecting signals, and generating a masking output signal when activated clock selecting signal is occured among the k number of clock, a second multi-phase comparator and clock phase selector 300 for detecting a clock whose transition is occurred in close vicinity of a center between an external input data Din and an external inverting input data Din/, among $k+1^{th}$ to $2k+1^{th}$ multi-phase clocks, to generate the k number of clock selecting signals ($E_{k+1}$~$E_{2k}$), generating a masking output signal when activated clock selecting signal is occured among the k number of clock, and masking activated clock selecting signal when the masking output signal of the first multi-phase comparator and clock phase selector 200 is inputted, a synthetic clock generator 400 for synthesizting the 2k number of clock selection signals ($E_1$~$E_{2k}$) to generate a composite clock CC, and a retiming buffer 500 for retiming the external input data Din and the external inverting input data Din/ according to the composite clock of the synthetic clock generator 400.

The operation of the digital phase alignment apparatus will now be explained in detail.

The clock inputted from the external becomes to n multi-phase clocks using delay devices(11, 12, . . . , 1(2k)). The multi-phase clock and external input data of adjoining two are inputted to a positive phase detector and phase selector (2001, 2002, . . . , 200k), to output the clock selecting signal (E1~Ek).

If the clock selecting signal activated in a first multi-phase comparator and clock phase selector 200 exists, it is necessary to mask the clock selecting signal of a second multi-phase comparator and clock phase selector 300.

As a result, Mout1 directly is inputted to Min of the second multi-phase comparator and clock phase selector 300, the master signal input of the first multi-phase comparator and clock phase selector 200 is the logic '0'.

Accordingly, the number of activated clock selecting signal of the clock selection signals of $E_{2k}$ becomes 1 by means of a masking signal control. When the clock selection signal activated in the first multi-phase comparator and clock phase selector 200 doesn't exist, the clock selection signal activated in the second multi-phase comparator and clock phase selector 300 can be outputted.

However, in the case that the number of the multi-phase comparators and clock phase selectors are 3, the clock selection signal output from the second and third multi-phase comparators and clock phase selectors should be masked when the clock selection signal from first multi-phase comparator and clock phase selector is outputted to the activated state, however, when all clock selection signal is outputted to the inactivated state from the first multi-phase comparator and clock phase selector, and the clock selection signal is outputted to the activated state from the second multi-phase comparator and clock phase selector, to be inputted to Min of the third multi-phase comparator and clock phase selector 403 taking Mout1 and Mout2 as the logic addition. Simultaneously, the logic can be applied when the number of the multi-phase comparator and clock phase selector is m.

The present invention has the following effects.

First, to select the clock whose the transition is occured in the close vicinity of a center of the input data unit interval, the rising transition or falling transition of data are detected, as a result, to generate the synthetic clock retiming data upon detecting the transition of data having a random bit column, the retiming clock is reached in the center of eye pattern of data, compared with a single directional transition is detected.

Second, as the clock selecting signal is produced by the resolving circuit using the transition of the input data to reduce a metastability which can occur by means of jitter existing between the external input data and retiming clock, the input data is stably retimed upon reducing the defect probability due to the metastability.

Third, the present invention limits the activated clock selection signal number outputted from the multi-phase comparators and clock phase selectors of the number of m to 1, so the jitter of synthetic clock is reduced at minimum and the minimum pulse width of the synthetic clock can be insured, as a result, the bit error rate can be reduced when restoring data.

As described above, although the present invention has been described in detail with reference to illustrative embodiments, the invention is not limited thereto and various modifications and changes may be effected by one skilled in the art within the scope of the invention.

What is claimed is:

1. A digital phase alignment apparatus in consideration of metastability, comprising:

a multi-phase clock generating means for delaying source clock to generate first to $n^{th}$ multi-phase clocks;

first multi-phase comparating and clock phase selecting means for detecting a clock whose transition is occurred in close vicinity of a center of external input data, among first to $k+1^{th}$ multi-phase clocks, to generate the k number of clock selecting signals, and generating a masking output signal when activated clock selecting signal is occured among k number of clock selection signals;

second multi-phase comparating and clock phase selecting means for detecting a clock whose transition is occured in close vicinity of a center of external input data, among $k+1^{th}$ to $2k+1^{th}$ multi-phase clocks, to generate the k number of clock selection signals, generating a masking output signal when activated clock selecting signal is occured among the k number of clock selecting signals, and masking activated clock selecting signal when the masking output signal of said first multi-phase comparating and clock phase selecting means is inputted;

$m^{th}$ multi-phase comparating and clock phase selecting means for detecting a clock whose transition is occured in close vicinity of a center of external data, among $n-k^{th}$ to $n^{th}$ multi-phase clocks, to generate k number of clock selecting signals, generating a masking output signal when activated clock is occured among the k number of clock selection signals, and masking activated clock selecting signal when a masking input signal is inputted;

a OR gate for ORing masking output signals of said multi-phase comparating and clock phase selecting means to generating a masking input signal, and supplying the masking input signal to said $m^{th}$ multi-phase comparating and clock phase selecting means;

a synthetic clock generating means for synthesizing the n−1 number of clock selection signals; and a retiming buffer means for retiming external input data according to the synthesized clock of said synthetic clock generating means.

2. The apparatus of claim 1, wherein said multi-phase clock generating means includes the n−1 number of devices.

3. The apparatus of claim 1, wherein the phase difference between first and $n^{th}$ multi-phase clocks generated by said multi-phase clock generating means is greater than or equal to a period of the source clock.

4. The apparatus of claim 1, wherein the masking input signal of said first multi-phase comparating and clock phase selecting means is set to zero.

5. The apparatus of claim 1, wherein said first multi-phase comparating and clock phase selecting means comprises:

a k number of both phase detector for detecting clock whose transition is occured in close vicinity of a center of rising transition or falling transition of external input data respectively, among two number of adjacent multi-phase clocks of said multi-phase clock generating means, to generate a rising transition detecting signal and falling transition detecting signal;

a k number of phase selector for generating the k number of clock selecting signals and masking signals using the rising transition detecting signal and falling transition detecting signal generated by the k number of both phase detector;

a OR gate for ORing the k number of masking output signals generated by the k number of phase selector.

6. The apparatus of claim 5, wherein said k number of both phase detector comprise respectively:

first and second D flip-flops for delaying two number of adjacent clocks according to external input data used as a clock;

a first OR gate for ORing inverting signal of output signal of first D flip-flop, output signal of second D flip-flops, and inverting signal of external input signal to generate rising transition detecting signal;

third and fourth D flip-flops for delaying two number of adjacent clocks according to inverting signal of external input data used as a clock;

second OR gate for ORing inverting signal of output signal of third D flip-flop, output signal of fourth D flip-flop, and inverting signal of inverting signal of the external input signal to generate falling transition detecting signal.

7. The apparatus of claim 5, wherein said k number of phase detector comprise respectively:

first AND gate for ANDing rising tansition detecting signal and the falling transition detecting signal generated by said both phase detector;

first D flip-flop for delaying the output signal of said first AND gate according to external input data used as a clock;

second D flip-flop for delaying the output signals of first AND gate according to invering signal of external input data used as a clock;

second AND gate for ANDing the output signal of first and second D flip-flops;

a OR gate for ORing the clock generated by said multi-phase clock generating means, the output signal of the second AND gate, and masking input signal of said OR gate to generate clock selecting signal;

an inverter for inverting the output signal of second AND gate to generate a masking output signal.

8. The apparatus of claim 1, wherein said synthetic clock generating means includes a AND gate.

9. A digital phase alignment apparatus in consideration of metastability, comprising:

a multi-phase clock generating means for delaying source clock to generate first to $2+1^{th}$ multi-phase clocks;

first multi-phase comparating and clock phase selecting means for detecting a clock whose transition is occurred in close vicinity of a center between an external input data and an external inverting input data, among first to $k+1^{th}$ multi-phase clocks, to generate k number of clock selecting signals, and generating a masking output signal when activated clock selecting signal is occured among the k number of clock selection signals;

second multi-phase comparating and clock phase selecting means for detecting a clock whose transition is occured in close vicinity of a center between the external input data and the external inverting input data, among k+1$^{th}$ to 2k+1$^{th}$ multi-phase clocks, to generate the k number of clock selection signals, generating a masking output signal when activated clock selecting signal is occured among the k number of clock selection signals, and masking activated clock selecting signal when the masking output signal of said first multi-phase comparating and clock phase selecting means is inputted;

a synthetic clock generating means for synthesizing the 2k number of clock selecting signals to generate a composite clock; and a retiming buffer means for retiming external input data according to the composite clock of said synthetic clock generating means.

10. The apparatus of claim 9, wherein said multi-phase clock generating means includes the 2k number of delay devices.

11. The apparatus of claim 9, wherein the phase difference between first and 2+1$^{th}$ multi-phase clocks generated by said multi-phase clock generating means is greater than or equal to a period of the source clock.

12. The apparatus of claim 9, wherein the masking input signal of said first multi-phase comparating and clock phase selecting means is set to zero.

13. The apparatus of claim 9, wherein said first multi-phase comparating and clock phase selecting means comprises:

a k number of both phase detector for detecting clock whose transition is occured in close vicinity of a center of rising transition or falling transition of external input data respectively, among two number of adjacent multi-phase clocks of said multi-phase clock generating means, to generate a rising transition detecting signal and falling transition detecting signal;

a k number of phase selector for generating the k number of clock selecting signals and masking signals using the rising transition detecting signal and falling transition detecting signal generated by the k number of both phase detector;

a OR gate for ORing the k number of masking output signals generated by the k number of phase selector.

14. The apparatus of claim 13, wherein said k number of both phase detector comprise respectively:

first and second D flip-flops for delaying two number of adjacent clocks according to external input data used as a clock;

a first OR gate for ORing inverting signal of output signal of first D flip-flop, output signal of second D flip-flops, and inverting signal of external input signal to generate rising transition detecting signal;

third and fourth D flip-flops for delaying two number of adjacent clocks according to inverting signal of external input data used as a clock;

second OR gate for ORing inverting signal of output signal of third D flip-flop, output signal of fourth D flip-flop, and inverting signal of inverting signal of the external input signal to generate falling transition detecting signal.

15. The apparatus of claim 13, wherein said k number of phase detector comprise respectively:

first AND gate for ANDing rising tansition detecting signal and the falling transition detecting signal generated by said both phase detector;

first D flip-flop for delaying the output singnal of said first AND gate according to external input data used as a clock;

second D flip-flop for delaying the output signals of first AND gate according to invering signal of external input data used as a clock;

second AND gate for ANDing the output signal of first and second D flip-flops;

a OR gate for ORing the clock generated by said multi-phase clock generating means, the output signal of the second AND gate, and masking input signal of said OR gate to generate clock selecting signal;

an inverter for inverting the output signal of second AND gate to generate a masking output signal.

16. The apparatus of claim 9, wherein said synthetic clock generating means includes a AND gate.

* * * * *